Jan. 6, 1953 G. A. SEIDEL 2,624,442
LAY-UP TABLE FOR ASSEMBLING LAMINAE
Filed Nov. 10, 1948 2 SHEETS—SHEET 1

INVENTOR.
GUSTAV A. SEIDEL
BY
Wheeler, Wheeler & Wheeler
ATTORNEYS

Jan. 6, 1953           G. A. SEIDEL           2,624,442

LAY-UP TABLE FOR ASSEMBLING LAMINAE

Filed Nov. 10, 1948           2 SHEETS—SHEET 2

INVENTOR.
GUSTAV A. SEIDEL
BY
Wheeler, Wheeler & Wheeler
ATTORNEYS

Patented Jan. 6, 1953

2,624,442

UNITED STATES PATENT OFFICE 2,624,442

LAY-UP TABLE FOR ASSEMBLING LAMINAE

Gustav A. Seidel, Mellen, Wis., assignor to Splicedwood Corporation, Mellen, Wis., a corporation of Wisconsin Application November 10, 1948, Serial No. 59,402

7 Claims. (Cl. 198—29)

This invention relates to improvements in a conveyor lay-up table for the progressive assembly of commercial panels of plywood, regardless of size or thickness.

It is the object of the invention to provide a table of universal application to expedite the assembly of veneer in the manufacture of plywood and to provide suitable gages so that all of the various plies will be assembled in proper relationship, with an arrangement whereby the lifting of the gages from the path of the assembled plies and the supporting caul board will automatically initiate movement of the caul board from the point of assembly to make room for a subsequent assembly operation.

Standard commercial panels of plywood, regardless of size or thickness and regardless of the number of plies employed, include a high quality face ply, a core, usually of lower quality, and a back ply which may be of high quality or inferior quality according to the use to which the finished plywood is to be put. The core may consist of one or more plies. While all of the plies will normally be made of wood veneer, any one or more of the plies may be made of metal, paper or other material.

Up to the point of assembly of the several plies in the panels, the operations of plywood manufacture are more or less independent in nature. The splicing of the veneers, sizing, grading as to quality and storage of the various types of veneer, each for its own use, in face stock, core stock and back stock are all separate operations. At the point of assembly, the three veneer groups above defined converge. It is important that at this point the assembly comprise a smooth, concise, rapid operation. Any delay at the point of assembly may reduce the speed of operation of each of the several lines converging at this point.

The invention will be more particularly understood in connection with the following disclosure of the improved apparatus.

Figure 1:
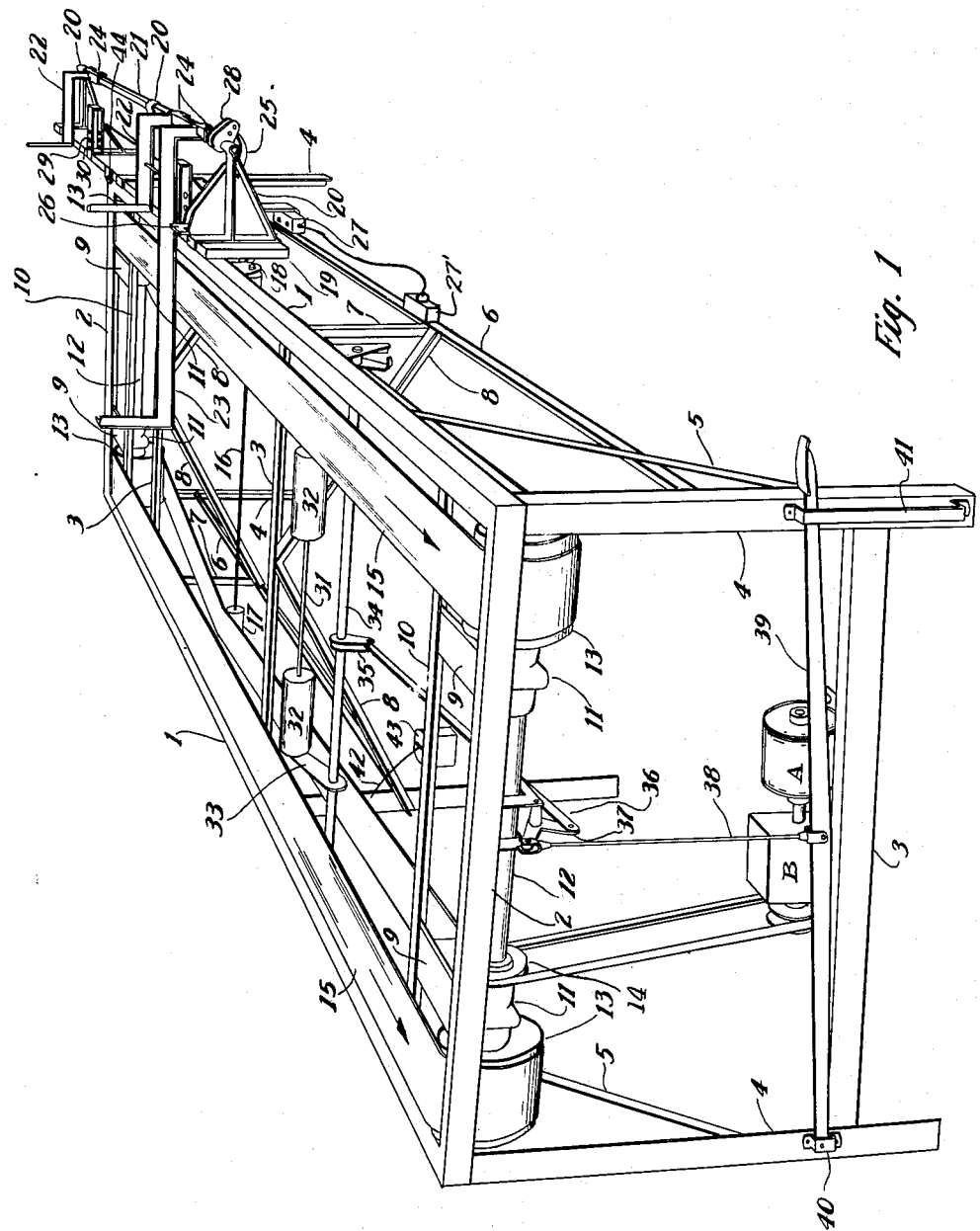
Fig. 1 is a view in perspective showing the assembly table.

The lay-up table comprises a frame which includes side rails 1, end members 2 and intermediate cross members 3. The size of the table is dependent upon the width of the plywood to be handled and the length it travels to the next operation. For the purposes of the present disclosure, the table may be assumed to be approximately three feet by fifteen feet in plan. The table top frame is supported by legs 4 braced by braces 5, truss members 6, struts 7 and internal braces 8. Connected between end members 2 and the adjacent tranverse members 10 near the respective ends of the table are the bearing block supports 9 which carry bearing blocks 11 for the shafts 12 of pulleys 13. A driving pulley 14 on one of the shafts 12 receives power from any suitable source such as the electric motor A and the gear reduction unit B. Operating over the pulleys 13 are the conveyor belts 15 which extend along the two sides of the table frame, their upper runs being slightly projecting above such frame for the support of the work. These belts move from front to back as viewed in Fig. 1, the direction of movement being indicated by the arrows.

Figure 2:
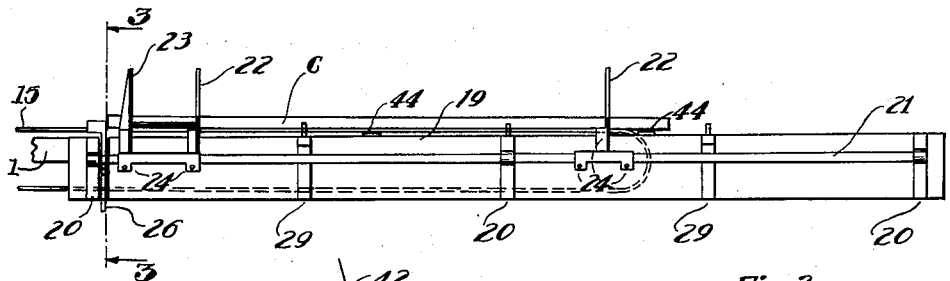
Fig. 2 is a fragmentary detail view of a portion of the table as it appears in side elevation.

In accordance with conventional practice, the plies assembled to constitute the plywood panels are mounted on boards known to the art as "caul boards," one of which is shown at C in Fig. 2. These caul boards are usually somewhat larger than the panel to be assembled thereon. In practice, they may be approximately one inch thick and four feet by eight feet in area. One such board is placed on the table, resting on the conveyor belts 15 at the rear of the machine, as viewed in Fig. 1, where its position is determined by a guide device now to be described.

Figure 3:
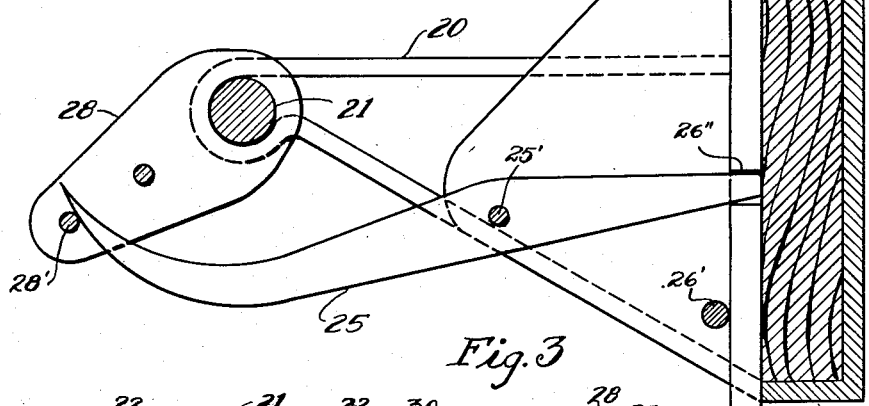
Fig. 3 is a fragmentary detail view shown greatly enlarged in a section taken on the line 3—3 of Fig. 2.

The guide device hangs either upon the side or the end of the table frame. In Fig. 1, it is shown at the side thereof while in Fig. 4 it is diagrammatically illustrated in plan at the end of the table frame. The guide device comprises a subframe or side support 19 which may be made with a wooden core, as indicated in Fig. 3 in a channeled housing. It is connected with the table frame by supporting brackets 44 which may be attached either to the side or the end of the frame, as shown.

The side frame 19 has projecting brackets 20 which provide a bearing for a rock shaft 21 which carries various gage arms hereinafter to be described. Except where it bears in the brackets 20, the shaft 21 is preferably made of square steel stock upon which the side guides 22 and end guide 23 are slidably adjustable to be clamped by bolts 24. These guides are also interchangeable as to width and may be supplied in various dimensions.

Likewise mounted on shaft 21 to oscillate therewith is the rocker arm 28 which has a pin 28' in camming engagement with the end of lever 25 pivoted at 25' (Fig. 3) to the structure of bracket 20. Additional pins 26' carried by the bracket structure serve to guide the vertically reciprocable plunger 26 (Fig. 3), which is socketed at 26" to receive the end of lever 25 whereby such lever will raise and lower the plunger in accordance with the oscillation of rock shaft 21. In the course of its downward movement, the plunger 26 will strike the contact button in switch 27 to close the switch, this switch being connected into the circuit of motor A in series with the normally closed switch 43. Thus, the closing of the switch 27 will ordinarily start the motor, while the breaking of the circuit of switch 43 through manipulation of its moving contactor 42 will interrupt the operation of motor A. Motor operation may also be interrupted through the automatic opening of switch 27 when the plunger 26 is raised.

Figure 4:
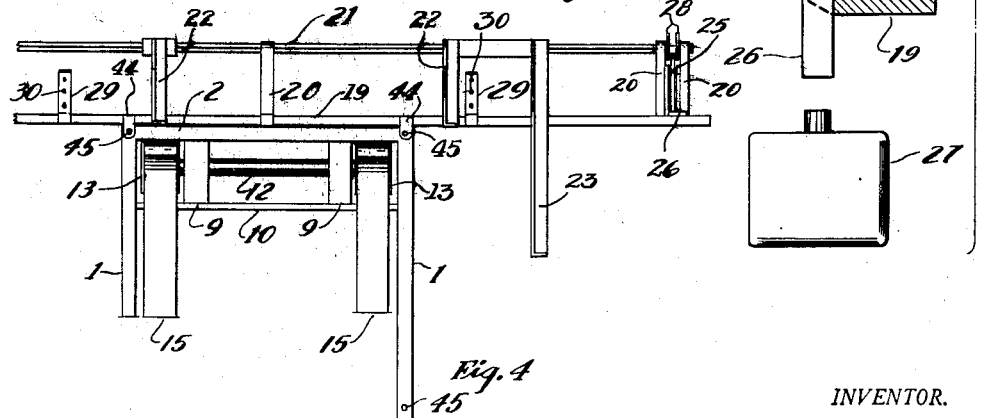
Fig. 4 is a fragmentary plan view of the table of Fig. 1 showing the gage mechanism supported on the table in a position different from that illustrated in Figs. 1 and 2.

The sub-frame 19 also carries at 29 permanent guide supports shown in Fig. 2 and Fig. 4 for locating the caul board. These supports are drilled with holes 30 to permit the insertion of dowels to fix various caul board positions. A forward stop which locates the forward edge of the caul board is provided by the top end of the plunger 26. This plunger normally projects into the path of caul board movement on the conveyor belts 15, but may be retracted below the level of the conveyor belts when the lever 25 acts downwardly thereon.

With the guide device mounted at the side of the table as shown in Fig. 1, the switch 27 is plugged into a receptacle 27' at the side of the table to control the motor circuit. The caul board is laid on the belts 15 in a position determined laterally by the guides 29 and longitudinally by the stop plunger 26.

The side guides 22 for the work project slightly over the margin of the caul board and the end guide 23 for the work is likewise within the front or leading margin of the caul board. The face ply for the first plywood panel is laid face down on the caul board and one or more core plies passed through a gluing machine which uniformly coats both sides with glue may then be assembled to the face ply. The back ply is then laid on the core to complete a single panel.

Ordinarily more than one panel is stacked on a caul board, the margins of the various plies being maintained in registry by the vertically extending portions of the side and end guides. The next face ply is laid face down on the unglued, exposed face of the back ply of the original panel. One or more core plies, previously glued, may then be assembled on to the face ply of the second panel and covered with a back ply of the second panel. Similarly, a third or more panels may be assembled if desired until any determined load for a given caul board is complete.

Figure 5:
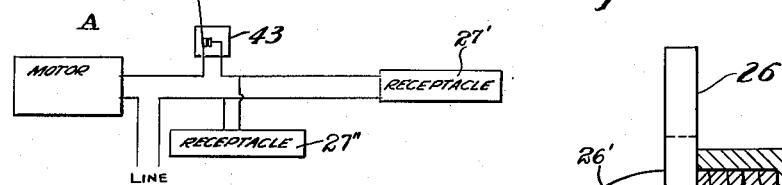
Fig. 5 is a diagrammatic drawing of a portion of the motor circuit.

At this point, the operator raises the stop arm 23 which, being keyed to the squared portion of the rock shaft 21, causes such shaft to oscillate, thereby lifting the side guides 22 from contact with the sides of the assembled veneer stock and ultimately, through the operation of the arm 28 and lever 25, causing the downward retraction of the stop plunger 26 with which the caul board is engaged. As soon as such plunger clears a forward edge of the caul board, it closes switch 27 which is plugged into the motor circuit receptacle 27', thus initiating movement of motor A to actuate the conveyor belts 15. These move the caul board and its load of assembled veneers out of the assembly station at the rear of the table to an advanced position at the front of the table where the caul board encounters the finger 42 which is connected to the moving contact of switch 43 as best shown in Figs. 1 and 5. This opens the motor circuit, bringing the conveyor belts to rest. A new caul board will immediately be placed on the belts at the rear of the table, the gage arms 22 and 23 being lowered into operative position, thereby raising the caul board stop plunger 26 and opening switch 27. In consequence of the opening of this switch, the subsequent removal of the caul board for transfer to the press in which the panels are completed will not cause resumption of motion of the conveyors 15.

When the panels to be assembled are very small, the work may be expedited by placing the veneers and particularly the face and back veneers, from both sides of the table. For this purpose, the guide assembly is affixed to the back of the table as shown in Fig. 4, the switch 27 being then plugged into the receptacle 27" (Fig. 5). In this operation, the caul board may be set transversely of the table, its ends still being engaged by the plunger 26 and its side by the dowels in the apertures 30 of members 29. One of the gage arms 22 will be used for one stack of plies, while the other gage arm 22 may be used for another stack, the operation otherwise being identical with that already described.

It would be difficult to move the caul board from the table upon the stationary belts 15 but for the transfer arrangement which includes the pedal lever 39, link 38, bell crank 37, line 36, arm 35, rock shaft 34, arms 33 and rollers 32. The rollers 32 are normally carried in the retracted position shown in Fig. 1 where they lie just below the level of the conveyors. When a caul board with its completed load of assembled plies is delivered by the conveyors to the discharge end of the table, and the conveyors have come to rest, the operators desiring to remove the caul board will find its removal facilitated by depressing the pedal lever 39 to raise the rollers 32, whereupon the weight of the board is transferred from the conveyors 15 to the rollers 32, over which the board will roll for further movement to and beyond the end of the table.

What is claimed is:

1. Apparatus for the assembly of veneer upon a caul board, such apparatus comprising a conveyor table having conveyor means operable thereover in combination with a sub-frame mounted at the sides of the table, conveyor driving means including a starting control plunger carried by said sub-frame, the top of said control plunger being disposed in the path of caul board movement upon said conveyor and reciprocable from such path upon the depression of the plunger to initiate conveyor movement, and a veneer locating member operatively mounted for movement to and from the path of veneer assembled on the caul board, said member having a motion transmitting connection with said plunger whereby the movement of said member from the path of such veneer will occur concurrently with the movement of said plunger from the path of the caul board and concurrently with the initiation of conveyor movement by said plunger.

2. The combination of claim 1 in further combination with means at a remote part of said table for arresting conveyor movement irrespective of the position of said plunger.

3. A sub-frame organization for attachment to an assembly table provided with a conveyor, said sub-frame organization comprising bearing means, a rock shaft mounted thereon, positioning arms including lateral locating members adjustably keyed to said rock shaft, and a stop arm connected to oscillate with the rock shaft and projecting far beyond said sub-frame to extend over a table with which said sub-frame is associated, and a conveyor control switch having an actuator connected to be operated by said rock shaft.

4. A sub-frame organization for attachment to an assembly table provided with a conveyor, said sub-frame organization comprising bearing means, a rock shaft mounted thereon, positioning arms including lateral locating members adjustably keyed to said rock shaft, and a stop arm connected to oscillate with the rock shaft and projecting far beyond said sub-frame to extend over a table with which said sub-frame is associated, and a switch having an actuator connected to be operated by said rock shaft, said actuator comprising a retractible plunger having a normally projecting portion disposed adjacent the side of the sub-frame to be in the path of a caul board mounted on said table and to be retracted from such path when said rock shaft is oscillated and said arms are raised from such path.

5. A device of the character described comprising an assembly table and conveyor means operable thereover, a caul board stop normally disposed in the path of caul board movement on said conveyor means and retractible downwardly from said path, veneer locating members normally disposed in the path of veneer assembled on a caul board mounted on said conveyor means, said members being provided with mountings guiding them for movement upwardly from the path of such veneer, and motion transmitting connections from said members to said caul board stop whereby the latter moves downwardly as said members move upwardly.

6. The device of claim 5 in further combination with a motor having driving connections to said conveyor means, and a motor controlling switch normally open and provided with a contact actuator for closing the switch and connected to be operated on movement of said connections.

7. The device of claim 6 in further combination with a second switch in series with the first and normally closed, said second switch including the contact opening finger in the path of work movement upon said conveyor whereby to interrupt the conveyor movement irrespective of the closing of the switch first mentioned.

GUSTAV A. SEIDEL.

REFERENCES CITED

The following references are of record in the file of this patent:

UNITED STATES PATENTS

| Number | Name | Date |
|---|---|---|
| 1,861,963 | Jennings et al. | June 7, 1932 |
| 2,160,476 | Kampmeier | May 30, 1939 |
| 2,193,840 | Oberhoffken | Mar. 19, 1940 |
| 2,227,145 | Lex et al. | Dec. 31, 1940 |
| 2,285,321 | Zademach | June 2, 1942 |
| 2,313,478 | Neja | Mar. 9, 1943 |
| 2,508,861 | Jessen | May 23, 1950 |

FOREIGN PATENTS

| Number | Country | Date |
|---|---|---|
| 542,628 | Great Britain | Jan. 20, 1942 |